United States Patent [19]

Roth

[11] Patent Number: 5,056,564

[45] Date of Patent: Oct. 15, 1991

[54] INSULATING MAT FOR BODIES OF WHICH AT LEAST PORTIONS OF THE SURFACE ARE CURVED, AND IN PARTICULAR FOR PIPES, AND THE USE OF SUCH A MAT

[75] Inventor: Klaus Roth, Viernheim, Fed. Rep. of Germany

[73] Assignee: Isover Saint-Gobain, Courbevoie, France

[21] Appl. No.: 312,494

[22] Filed: Feb. 21, 1989

[30] Foreign Application Priority Data

Feb. 19, 1988 [DE] Fed. Rep. of Germany ....... 3805269

[51] Int. Cl.$^5$ .................................................. F16L 9/14
[52] U.S. Cl. ..................................... 138/149; 138/110; 428/74; 428/76; 122/494
[58] Field of Search ............... 138/103, 110, 137, 149, 138/172, 174; 428/68, 72, 74, 76, 34.5, 99; 122/494; 220/452

[56] References Cited

U.S. PATENT DOCUMENTS

| | | | |
|---|---|---|---|
| 1,661,254 | 3/1928 | Gillies | 138/149 |
| 1,907,307 | 5/1933 | Smith | 138/149 |
| 2,949,953 | 8/1960 | Maio et al. | 138/149 |
| 3,012,923 | 12/1961 | Slayter | 138/149 |
| 3,117,902 | 1/1964 | Holzheimer | 138/149 |
| 3,620,258 | 11/1971 | Graham | 138/149 |
| 4,025,680 | 5/1977 | Botsolas et al. | 138/149 |
| 4,155,377 | 5/1979 | Suzuki et al. | 138/149 |
| 4,205,105 | 5/1980 | Blundell | 138/149 |
| 4,576,206 | 3/1986 | Lauren | 138/149 |
| 4,732,177 | 3/1988 | Maus et al. | 138/149 |
| 4,823,845 | 4/1989 | Martin et al. | 138/149 |
| 4,878,459 | 11/1989 | Nelson | 122/494 |
| 4,972,759 | 11/1990 | Nelson | 138/149 |

FOREIGN PATENT DOCUMENTS 3531751  3/1987  Fed. Rep. of Germany ...... 138/149

Primary Examiner—James E. Bryant, III
Attorney, Agent, or Firm—Oblon, Spivak, McClelland, Maier & Neustadt

[57] ABSTRACT

Bracing strips 7 are interposed between compressible strips 4, so-called laminate strips, of an insulating mat 1 in the form of a laminate mat with a carrier web 2, in order generally to impart compression resistance to the insulating mat 1. The compressible strips 4 normally consist of mineral fibers 6 of low compression resistance and are readily compressible parallel with the plane of the carrier web 2, while the bracing strips 7 consist of mineral fibers of higher compression strength and are substantially incompressible. Particularly good compression strength results from the fibers 8 of the bracing strips 7 also being orientated at right-angles to the carrier web 2. The resulting pressure-resistant laminate insulating mats 1 are suitable not only for the conventional fields of application of laminate mats but can also serve at the same time as a bracing since in many cases they offer superior qualities to those of supports or braces which consist of solid bodies.

8 Claims, 2 Drawing Sheets

1

INSULATING MAT FOR BODIES OF WHICH AT LEAST PORTIONS OF THE SURFACE ARE CURVED, AND IN PARTICULAR FOR PIPES, AND THE USE OF SUCH A MAT

BACKGROUND OF THE INVENTION

1. Field of the Invention

The invention relates to an insulating mat for bodies of which the surface has at least portions which are curved, particularly pipes.

2. Background of the Related Art

Usually, what are referred to as pipe insulating shells are formed of mineral fiber material. Such pipe insulating shells are produced by wrapping a mineral fiber fleece incorporating a binding agent around a core, the outside diameter of which corresponds to the diameter of the pipe to be insulated, and hardening the mineral fiber material which is thus wrapped into a tubular form. This produces a shell body the shape of which is stable, which offers good heat insulating capacity and also comparatively high compression resistance. Insulated pipes, such as for example district heating pipes, which have been insulated by means of such pipe insulating shells, thus have a surface which is stable under compression and which can be subjected to a loading, and can, for example, be walked upon.

However, a disadvantage of such pipe insulating shells resides in the fact that they necessarily must be prefabricated for a specific diameter of pipe and can therefore only be used for such a pipe. This means that it is necessary to carry a wide variety of such pipe insulating shells, resulting in considerable stock-keeping expenses, and the freedom with which such insulating elements can be used is adversely affected. Furthermore, the pipe insulating shells which have to be prefabricated to their final shape also have to be stored and dispatched in this shape, resulting in considerable storage and transport bulk. Where these so-called solid shells are used, it is furthermore necessary that the pipe to be insulated be accessible from its end so that the solid shell can be pushed onto the pipe. In order to avoid this need, and also for subsequent insulation jobs, it must be possible to apply the insulating member from the side, a possibility afforded by using slotted solid shells, half shells or other suitable shell segments. In any case, the prefabricated form of the shell presents difficulties with insulation in confined spaces, such as shafts or the like, since the shells or shell segments are correspondingly bulky. Fitting of the pipe insulating shells onto the pipe to be insulated requires an inconsiderable freedom of movement in the immediate vicinity of the pipe, and this is often not available.

Furthermore, the ability to use pipe insulating shells is confined to pipes of circular cross-section, whereas the same kind of insulation is impossible, for instance, in the case of rectangular ducting.

For insulating surfaces of which at least parts are curved, so-called laminate mats are also known which are produced by applying individual strips ("laminate strips") of the mineral fiber material to a carrier web such as an aluminum mesh-lined film and solidifying the strips, the fibers of the individual strips being orientated in their preferred main direction at right angles to the plane of the carrier web. By fixing the strips on the carrier web, which is on the outside of the curvature, the width of the portions of the strips at the web is established, while the consistency of the strips is so chosen that with the radius of curvature envisaged, there is a correspondingly slight compression of the strips on the side opposite the carrier web.

The fibers are positioned more closely to one another transversely of their orientation and in this way the width of the strips is locally reduced without any substantial restoring forces and without distortion or kinking of the fibers. Therefore, the insulating mat acquires a flexurally soft character.

This offers the advantage that pipes of different diameters can be insulated with the same insulating product. Furthermore, components of different curvatures such as containers, air conditioning ducts, etc., can be insulated, the mat being adapted to any existing radius of curvature without difficulty.

However, pipe insulating shells cannot be replaced by laminate mats for all possible applications, because the laminate mats have a substantially lower compression loading capacity than pipe insulating shells so that they are suitable only for those applications in which only relatively low compression loading applies. The pressure loading capacity of the laminate mats cannot be easily increased either, since with increasing crude density and increasing binder content, the strips also become stiffer on the side opposite the carrier web so that they are no longer able to offer low-force compressibility to dissipate peripherally acting compression forces such as occur during adaptation to a radius of curvature.

SUMMARY OF THE INVENTION

It is an object of the present invention to substantially increase the compression strength of the insulating mat while retaining the consistency of the strips which ensures the necessary flexural softness of the insulating mat.

The above and other objects are accomplished according to the present invention by an insulating mat for bodies of which at least parts of the surface are curved, comprising a substantially planar carrier web and an insulating layer fixed to at least one surface of the carrier web. The insulating layer includes a plurality of mutually parallel compressible strips of mineral fiber material mounted to the carrier web and spaced in a direction included in the plane of the carrier web, a main orientation of the mineral fibers of the material of the compressible strips being substantially at a right angle to the plane of the carrier web. The insulating layer also includes bracing strips mounted to the carrier web at positions between the compressible strips, the bracing strips being constructed so as to have a compression strength in a direction at a right angle to the plane of the carrier web which is substantially greater than a compression strength of the compressible strips in that direction, so that upon applying the insulating mat to a convex curved body, the plurality of compressible strips are compressed in a wedge shape having a progressively reduced width with increased distance from the carrier web.

As a result of the fact that bracing strips of high compression strength are incorporated between the strips of low compression strength, the carrier web is at these bracing strips braced against any compression forces which occur so that the insulating mat as a whole is capable of accepting a compression loading which is applied to its outside. The compressible strips disposed between the bracing strips, and which have a low compressibility in the peripheral direction, further guarantee the ready flexibility of the insulating mat.

It is already known in the case of carrier webs with strips fixed thereon with a fiber orientation which is at right-angles to the carrier web, to dispose a different material between the strips. However, this different type of material is mineral fiber material having its main fiber direction parallel with the web, which means that it has even less compression resistance than the laminate strips. Thus, the overall insulating mat becomes even less compression resistant than with the exclusive use of compressible strips having a fiber orientation at right-angles to the carrier web. Furthermore, such an insulating mat can only be produced at considerable cost, since the individual strips of alternating fiber direction can only be applied to and fixed on the carrier web one at a time.

In a particularly advantageous manner, the bracing strips are formed by strips of mineral fiber material with the main fiber orientation likewise at right-angles to the plane of the carrier web but which, by virtue of their different consistency, offer a high compression resistance. When mineral fiber material is used for the bracing strips as well, the drop in the heat insulating capacity is small as compared with a conventional insulating mat composed solely of compressible laminate strips. By reason of the fact that the main orientation is also at right-angles to the plane of the carrier web and thus also at right-angles to the surface to be insulated, the fibers themselves, by reason of their orientation, help to improve the compression strength so that other parameters can be optimized with a view to maintaining the heat insulating capacity.

The compression strength of the mineral fiber material for the bracing strips is above 10 $kN/m^2$(kilonewtons per square meter), but is preferably above 30 $kN/m^2$ and is in particular above 50 $kN/m^2$.

The strips which constitute the bracing strips may be produced from rock fibers, while the compressible laminate strips are usually of glass fibers. The result is distinct differences in the coloring of the strips, producing a visual appearance of the compression-resistant insulating mat which makes it possible to differentiate between conventional, less pressure-resistant laminate mats at a glance. In addition, rock fibers can be produced more inexpensively than glass fibers so that the use of rock fibers for the bracing strips reduces the material costs.

The compressible strips and the bracing strips may be different widths, so that it is possible to easily adapt to the requirements of any given circumstance, and are preferably wider than the compressible laminate strips. This results in better all-over bracing against compression forces, which is particularly desirable if the carrier web itself is flexurally soft and therefore transmit to the adjacent bracing strips only the compression forces while transmitting flexural stresses only to a negligible extent. If the width of the laminate strips is around 10 to 20 mm, and is preferably about 10 mm while that of the bracing strips is around 20 to 40 mm and is preferably around 30 mm, then the bracing strips produce a fine-mesh bracing corset. Even if the carrier web is of extremely flexurally soft material, only puncture-like spot loadings in the region of the compressible laminate strips can possibly experience inadequate bracing, while even compression loadings on the surface of a sheath can be supported directly by the bracing strips, the compressible laminate strips being relieved of the load. Larger-area compression loadings such as typically occur are simultaneously absorbed by a plurality of bracing strips.

In this way, it is possible in the case of the applications typical of so-called laminate mats, to ensure a considerably higher compression loading capacity of the insulation using laminate mats. Furthermore, not only is the susceptibility of the insulation to damage greatly reduced, but it is furthermore ensured that laminate mats can also be used in the applications in which they would not in principle have been suitable but would have been rejected on grounds of inadequate compression strength.

Furthermore, there are a number of possible applications for insulations in which other less expensive insulating material than so-called wire mats (these are roll-up mineral fiber felts which are lined with wire thread on a galvanized woven wire mesh) can be used but where additional bracing structures are required.

This is the case for example when a pipeline having an inner medium-carrying pipe of a diameter over 100 mm or with insulating thicknesses over 50 mm (DIN 18421, DIN 4140, part 1) and an outer sheath, disposed at a distance therefrom and taking the form of a sheet metal sheath for instance, has to be insulated by wire mats in the gap between the medium-carrying pipe and the sheet metal sheath; then the relative position of the medium-carrying pipe and the metal sheath have to be secured by bracing structures such as metal spiders having a star shape and positioned around the medium carrying pipe, and which may, in order to avoid heat bridges, consist of a ceramic material which is more expensive than metal. Furthermore, there are cases, possibly in connection with medium-carrying pipes of intermittent hot and cold operation, in which the actual insulation located around the medium-carrying pipe and possibly in the form of a pipe shell has to be provided with some secondary ventilation space in order to prevent condensate accumulating. For such a case, it is known for example to ensure that such a secondary ventilation space is provided while at the same time securing the position of the outer shell by disposing a corrugated sheet between the outer shell and the outside of the insulation, the corrugated sheet having axially extending undulations.

With such instances of use, it is possible to use an insulating mat according to the invention to serve as a local spacer device for a rigid external sheath around the insulating structure. In this case, the insulating mat does not assume the function of ensuring the main insulation but has a structurally supporting function, to which end its compression-resistance and its adaptability to any desired contour may be exploited. The insulating mat according to the invention thus fulfills the function of a mechanical bracing means but can at the same time offer the benefit of its insulating capacity which is superior to that of conventional mechanical bracing means, in order to avoid heat bridges being provided by the bracing structure. If an axial exchange of air is necessary over the region of the bracing means, then either the relatively good air permeability of the laminate strips on the side of the carrier web may be used or gaps may be left clear between segmentally disposed short insulating mats. The width of the insulating mats used will be governed by the forces to be accommodated at the location in question and will be non-critical due to the satisfactory heat insulating capacity.

In this way, more or less broad strips of the laminate mat can be disposed directly between the surface of the body to be insulated, such as the medium-carrying pipe, and the outer sheath, and the remaining axial space between the bracing zones can be filled by a different insulating material. In a particularly preferred manner, the inner bracing of the insulating mat elements on the actual insulation may possibly take the form of pipe shells, so that the supporting of the insulating mat elements only leaves a secondary ventilation gap with respect to the outer sheath.

Since in those applications in which conventional laminate mats are actually used, an increased compression strength is not needed, the insulating mats according to the invention are only to a limited degree suitable as a substitute, because conventional laminate mats offer better heat insulation at lower cost, so that replacement by insulating mats according to the invention becomes uneconomical if their increased compression resistance is not required. However, it is particularly preferred to use an insulating mat according to the invention as an insulating layer and at the same time as a compression-resistant backing for a rigid outer sheath of an insulating structure. In this type of use, insulating mats according to the invention may to a considerable extent replace conventional pipe insulating shells.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
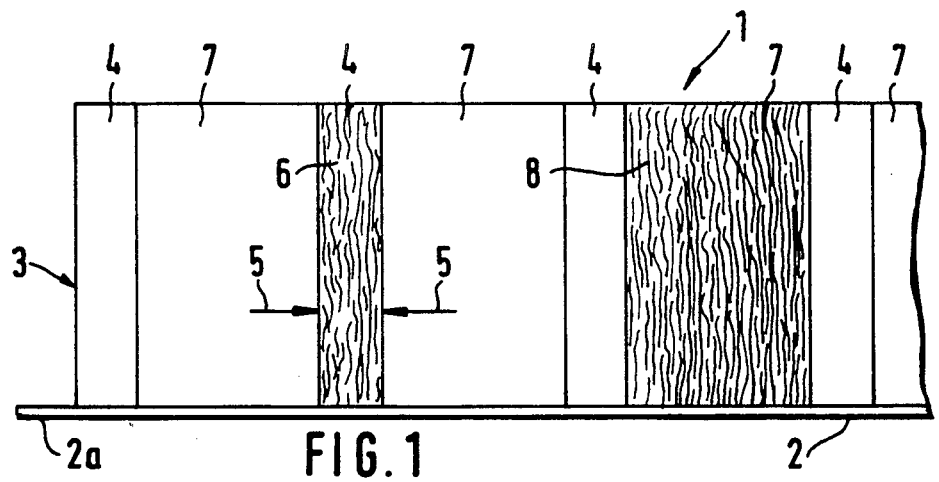
FIG. 1 is a partial transverse section through an insulating mat according to the invention, in a plane form, lying flat.

As FIG. 1 shows, an insulating mat according to the invention, generally designated 1, comprises a carrier web 2, for example in the form of an aluminum-mesh film, and an insulating layer 3 fixed thereto, possibly by an adhesive.

The insulating layer 3 has parallel adjacently-disposed compressible strips 4, also referred to as laminate strips, which are spaced in a direction of the plane of the carrier web 2 and are easily compressible when loaded in the direction of the arrow 5 in the drawing. To this end, the strips 4 have a relatively low compression resistance of for example 3 kN/m$^2$ and are so disposed that the main orientation of the mineral fibers 6 is at a right-angle to the plane of the carrier web 2.

Figure 2:
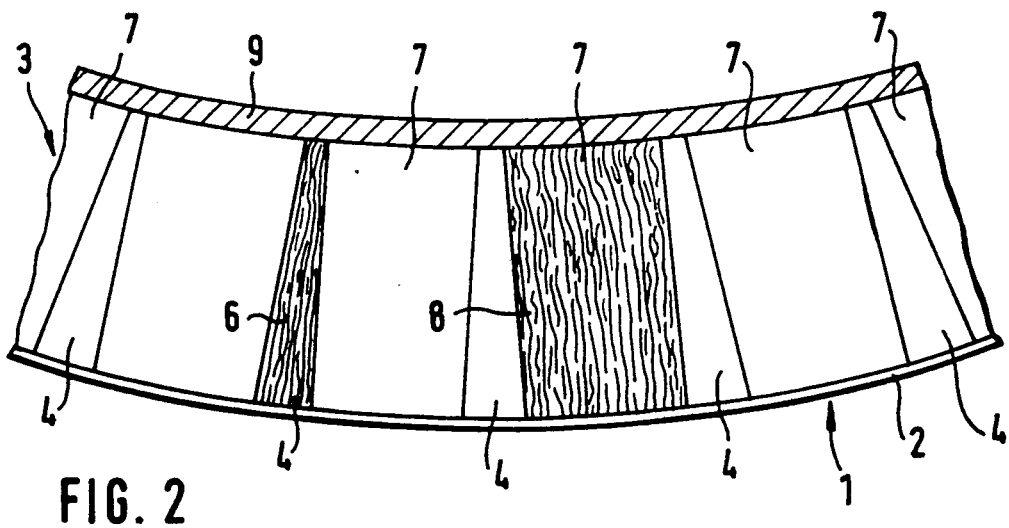
FIG. 2 shows the insulating mat of FIG. 1 in a curved position on a surface which is to be insulated.

As FIG. 2 shows, the compressibility of the strips 4 under a loading in the direction of the arrow 5 exhibits good convex flexibility with the carrier web 2 on the outside. Since the strips 4 are rigidly connected to the substantially inelastic carrier web 2, possibly by being glued, their width is fixed on the side of the carrier web 2. However, if the insulating mat 1 is curved as shown in FIG. 2, there is progressively increasing compression of the mineral fiber 6 (transversely to the direction of their main orientation) with increased distance from the carrier web 2, so that the strips 4 assume a wedge shape with a reduced width with increased distance from the carrier web 2. This is the principle on which conventional so called laminate mats work.

In the case of the insulating mat 1 according to the invention, however, the strips 4 are not disposed immediately adjacent one another to jointly form the insulating layer, as usual. Instead, there are between the strips 4 bracing strips 7, which replace the strips 4 which would otherwise be disposed there. The bracing strips 7 in the example shown consist of rock fibers 8 with a compression strength of 30 kN/m$^2$, the main fiber orientation of the rock fibers 8 likewise being at a right-angle to the plane of the carrier web 2. Due to the substantially increased compression strength of the bracing strip 7, instead of having the mat-like consistency of the strips 4, they have a substantially rigid plate-like consistency. The crude density required in order to achieve this compression strength and the binder content required are not too great if the main orientation of the fibers lies in the direction of the pressure loading, so that the rock fibers 8 are mainly subjected to a bending stress. The compression strength at right-angles to the fiber orientation, in other words in parallel with the plane of the carrier web 2, is markedly lower but not so low that when the insulating mat undergoes flexion, any substantial compression of the material of the bracing strips 7 might result. Such a compression or reduction in the widths of the bracing strips 7 opposite the carrier web 2 would not be harmful in any case and would basically be desirable, but would be barely attainable in view of the priority of the high compression strength.

As FIG. 2 shows, the shortening of the arc length required on the concave side of the insulating mat 1 when flexure is applied, occurs practically exclusively by compression of the strips 4, whereas the bracing strips 7 substantially retain their rectangular form. However, the bracing strips 7 do support considerable compression forces which occur on the convex side of the carrier web 2, and so protect the compressible strips 4 which are not pressure-resistant.

In order to achieve the best possible quasi-homogeneity of pressure bracing effect over the surface of the carrier web, while also achieving the smoothest possible curvature in the insulating mat 1, relatively thin strips 4 alternate with relatively thin bracing strips 7. In the example shown, the unladen width of the strips 4 according to FIG. 1 is about 10 mm while that of the bracing strips 7 is 30 mm, in an insulating layer 3 having a height of about 50 mm. On the assumption that with bending of the insulating mat, the concave inside surface of the strips 4 is not to be compressed substantially more intensely than, say, to half the width of the strips 4 on the side of the carrier web 2, then it is possible, and without problem, to insulate a minimum radius of curvature of about 300 cm. If for the same thickness of insulating layer 3, even smaller radii of curvature of the insulating mat 1 are required, then the width of the individual bracing strips 7 could be reduced accordingly. With a lesser insulating thickness, however, small radii of curvature could be achieved even without varying the proportions between the widths of the strips 4 and of the bracing strips 7.

Thus, according to the width and distribution of the strips 4 and of the bracing strips 7, and according to the admissible degree of compression of the material of the strips 4, there is on the concave inside surface a ratio of outer periphery to minimum admissible inner periphery of the curved insulating mat which is hereinafter referred to as v. If r denotes the radius of curvature of the surface to be insulated and d denotes the desired thickness of insulation, then a geometrical consideration shows that these values have the following relationship to one another:

$$d = r(v-1).$$

If, therefore, in the example shown, a radius of curvature r of 300 mm is to be insulated with an insulating mat 1 according to the invention, the admissible peripheral ratio v being 40:35, then the result is a maximum insulating thickness of 43 mm. In this way, it is possible in practice and by using appropriate charts, to associate a suitable maximum insulating thickness d with any radius of curvature r as a function of the nature of the insulating mat 1 used and making due allowance for the required insulating capacity and pressure-absorbing capacity.

The insulating mat 1 could of course also be used wherever laminate mats were hitherto used for insulating purposes; however, it is characterized by correspondingly high compression resistance so that it is preferably suited to fields of application in which compression strength is required.

In addition, however, the insulating mat 1 is also particularly suitable for those applications in which it is intended to improve not primarily the insulating capacity but primarily the compression resistance. In such cases, the insulating mat 1 can replace a mechanical bracing element and thus reliably exclude the possibility of heat bridges, by virtue of its satisfactory insulation properties.

Figure 3:
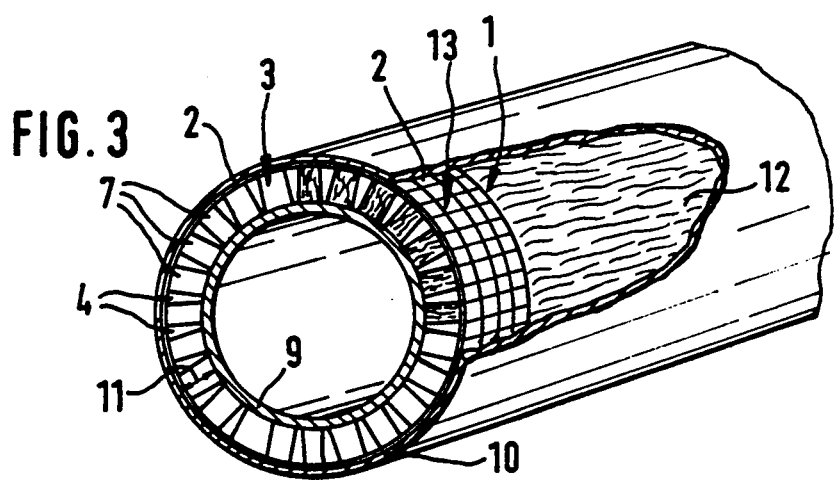
FIG. 3 is a perspective view of a portion of pipe with a narrow piece of an insulating mat according to the invention serving as a local spacer for a rigid outer sheath in the pipe structure.

Such an example of use is shown in FIG. 3. The wall 9 of the body to be insulated is in this example a pipe carrying a medium and enclosed by an outer sheath 10 which takes the form of a sheet metal sheath. Disposed in a gap 11 between the medium-carrying pipe and the sheet metal sheath is insulating material 12 which in the example shown takes the form of wire mats. Since the wire mats have only a relatively low resistance to compression a bracing means is required in the gap 11. Instead of conventional bracing means of metal or ceramic material, the bracing means 13 is formed by the insulating mat 1. For this purpose the insulating mat 1 is, at the location where a brace is required, wrapped around the medium-carrying pipe to form the bracing means 13, the sheet metal sheath 10 being thus supported on the outside of the carrier web 2. As may be readily appreciated, the bracing means 13 in the form of such an insulating mat 1 is extremely low in cost and should furthermore be preferred over all solid member braces in that it avoids heat bridges. By reason of the rigid outer sheath 10 offering satisfactory load distribution of the compression forces which occur, no particularly fine-distribution of narrow supporting strips 7 is required so that, if necessary, it is possible to work with strips 4 of conventional width of for instance around 50 mm or more and bracing strips 7 of corresponding width, which reduces manufacturing costs.

Figure 4:
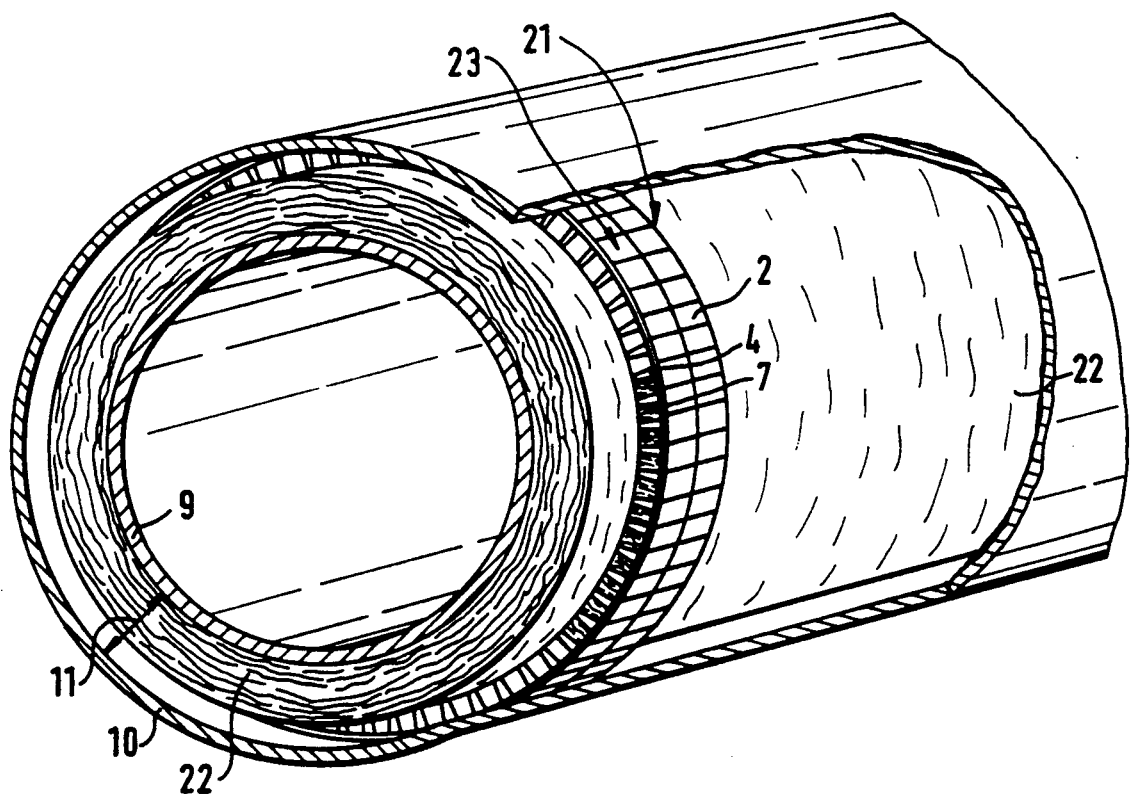
FIG. 4 is a view corresponding to FIG. 3 but showing a different method of use.

Instead of using a synthetic plastic sheath to form an annularly enclosed brace between the wall 9 of the body to be insulated (for example a medium-carrying pipe) and the outer sheath 10, it is possible according to FIG. 4 to use an insulating mat 21 according to the present invention to form a bracing means 23 in all those cases in which it is only necessary to maintain a secondary ventilation of an existing pipe insulation 22 of adequate compression strength and which takes the form of pipe insulating shells, possibly in order to avoid the accumulation of condensate. As FIG. 4 shows, the insulating mat of the invention 21 can then be made thinner and applied to the outside of the other pipe insulation 22 for bracing the gap between the outside of the pipe insulation 22 and the inside of the outer shell 10. The minimal insulating thickness of the insulating mat 21 here additionally ensures easy flexibility around particularly small radii of curvature, thus making it possible to use the insulating mat on relatively thin pipes or over relatively sharp edges. A possible need for axial air permeability is to a certain extent fulfilled by the consistency of the insulating mat 21 itself since, particularly in the vicinity of the carrier web 2, the strips 4 are formed of relatively loose material which is to a certain degree permeable to air. It is however also possible, instead of an annularly closed insulating mat 21 or even the insulating mat 1 according to the previous example of embodiment, to use a plurality of individual portions of lengths of insulating mat 1 or 21 to form the bracing means 13 or 23 and to distribute them over the periphery, leaving gaps for air exchange between the individual elements. At assembly, such segments of insulating mat 1 or 21 can be secured, perhaps by adhesion, so that these elements of insulating mats 1 or 21 can be fixed to or distributed over the periphery of the wall 9 or of the pipe insulation 22, like thrust blocks.

If the insulating mat 1 according to FIG. 2 also takes over the function of providing the main insulation, so replacing pipe insulating shells, for instance, then the bracing strips 8 have a compression strength of usually between 10 and 50 kN/m$^2$ and preferably 30 kN/m$^2$ and if suitably distributed and if they represent a corresponding part of the overall insulating layer 3, then they will produce what is generally a sufficient compression strength in the insulating mat 1 while at the same time offering good heat insulation. To form the bracing means 13 according to FIG. 3, one or more strips of insulating mat 1 of suitable width may be used so that, by having an appropriate width of bracing, adequate compression strength can be achieved. However, when the insulating mat 1 according to FIG. 3 is used, and in particular when the insulating mat 21 according to FIG. 4 is used, bracing strips of higher compression strength, of up to 100 kN/m$^2$ and more, may also be used in order to achieve even higher compression resistance. The more evenly the compression forces are transmitted to the surface of the insulating mat 21, possibly by a suitably rigid construction of the external sheath 10, the more it is possible to dispense with a homogeneous distribution of the bracing strips 7, the compression strength being achieved solely by increased compression resistance of the bracing strips 7. According to the needs of any particular circumstance, it is possible for either the strips 4 or the bracing strips 7 to be wider so that, in the light of the compression strength of the bracing strips 7, it is possible to achieve a desired overall compression strength in the insulating mat 1 or 21 while keeping zones of reduced compression strength in the region of the strips 4 as narrow as is necessary for the particular application in question.

As the foregoing description clearly shows, the invention is not limited to the embodiment which is illustrated. Instead, many modifications and deviations are possible without departing from the scope of the invention. For example, the strips 4 or bracing strips 7 do not need to be made in one piece but may be constituted by a plurality of adjacently-disposed strips or strip elements which may be of the same respective width but which may be combined to form different widths of strips 4 and bracing strips 7. Furthermore, instead of the glass fibers preferred for the strips 4, it is also possible to use other mineral fibers and the bracing strips 7 do not need to be of rock wool nor even necessarily of mineral fiber material since any supporting material is suitable if it has the properties which suit the envisaged application. Furthermore, over and above the instances of use which have been mentioned in detail, many fields of application are conceivable in which the insulating mat 1 or 21 or any desired small portions thereof may be used as pressure-loadable bodies in the form of flexible blocks, strips, webs, etc. as a spacing means adapted to accommodate a pressure loading having, and in comparison with hitherto used elements, improved heat insulating capacity and possibly also provided fire resistance as well as improved adaptability to the contours of the supporting surfaces.

What is claimed as new and desired to be secured by letters patent of the United States is:

1. An insulating mat for bodies of which at least parts of the surface are curved, comprising:
   a substantially planar carrier web; and
   an insulating layer fixed to at least one surface of said carrier web, said insulating layer comprising:
   a) a plurality of mutually parallel compressible strips of mineral fiber material mounted to said carrier and spaced in a direction included in the plane of said carrier web, a main orientation of the mineral fibers of said material of said compressible strips being substantially at a right angle to the plane of said carrier web, and
   b) bracing strips mounted to said carrier web at positions between said compressible strips, said bracing strips being constructed so as to have a compression strength in a direction at a right angle to the plane of said carrier web which is substantially greater than a compression strength of said compressible strips in said direction of a right angle to the plane of said carrier web,
   whereby upon applying said insulating mat to a convex curved body, said plurality of compressible strips of mineral fiber material are compressed into a wedge shape having a progressively reduced width with increasing distance from said carrier web, wherein said bracing strips each consist of a strip of mineral fiber material, a main orientation of the mineral fibers of said bracing strip being substantially at a right angle to the plane of said carrier web.

2. The insulating mat of claim 1 wherein said compression strength of said bracing strips is greater than 10 $kN/m^2$.

3. The insulating mat of claim 1 wherein said compression strength of said bracing strips is greater than 50 $kN/m^2$.

4. The insulating mat of claim 1 wherein said bracing strips are formed of rock fibers.

5. The insulating mat of claim 1 wherein a width of said bracing strips is greater than a width of said compressible strips.

6. The insulating mat of claim 6 wherein the width of said compressible strips is 10 mm–20 mm and the width of said bracing strips is 20 mm–40 mm.

7. The insulating mat of claim 1 in combination with said convex curved body, wherein said convex curved body is a pipe, further including a rigid sheath surrounding said insulating mat, whereby said insulating mat comprises a local spacing device between said pipe and said rigid sheath.

8. The insulating mat of claim 1 in combination with said convex curved body, wherein said convex curved body is a further insulating material, further including a rigid sheath surrounding said insulating mat, whereby said insulating mat comprises a local spacing device between said further insulating material and said rigid sheath.

* * * * *